United States Patent Office 3,567,779
Patented Mar. 2, 1971

3,567,779
COLOR STABILIZED DIMETHYLETHANOLAMINE
Vernon A. Currier and Ada Lichaa, Austin, Tex., assignors to Jefferson Chemical Company, Inc., Houston, Tex.
No Drawing. Filed Nov. 20, 1967, Ser. No. 684,493
Int. Cl. C07c 89/04
U.S. Cl. 260—584                                     2 Claims

ABSTRACT OF THE DISCLOSURE

Dimethylaminoethanol is stabilized against color change at its reflux boiling temperatures by incorporating in the dimethylaminoethanol a stabilizing amount of a mono- or di-lower alkanolamine.

BACKGROUND OF THE INVENTION

In the production of polyurethane foams, particularly polyester polyurethane foams, it was discovered that on occasion a normally snow-white foam would have a pink color to it. It was further determined that this detrimental color change occurred when dimethylaminoethanol was used as a part of the catalyst system in the polyurethane reaction.

Further investigation showed that apparently normal dimethylaminoethanol takes on a pink color when subjected to its reflux boiling temperature in the presence of air.

It was theorized therefrom that the pink color of the foam was caused by the change in color of the dimethylaminoethanol which, in turn, was brought about by the heat generated and temperature maintained within the cell structure of the foam during the polyurethane reaction.

The exothermic reactions of either a polyester polyol, a polyether polyol or water with an isocyanate result in the generation of heat, causing a temperature rise within the foam. This heat is held in the foam for a period of time sufficient to cause the dimethylaminoethanol to materially change color and cause an otherwise white foam to turn slightly pink.

Therefore, it is an object of our invention to provide a dimethylaminoethanol which is stable to color change at its reflux boiling temperature.

It is a further object of our invention to provide a method for stabilizing dimethylaminoethanol against color change at its reflux boiling temperature.

Other objects and advantages of our invention will become apparent to those skilled in the art in view of the following discussion and example and are intended to be encompassed within the scope of our invention.

SUMMARY OF THE INVENTION

Dimethylaminoethanol can be stabilized against color change by incorporating therein a stabilizing amount, preferably from about 0.25 to about 2.0 wt. percent based upon the dimethylaminoethanol, of a mono- (lower alkanol) amine or a di- (lower alkanol) amine. The lower alkanol groups suitable for use in the practice of this invention are those having from two to about four carbon atoms. The resulting stabilized dimethylaminoethanol composition may then be maintained at its reflux boiling temperature, approximately 130° to about 137° C., for a substantial period of time without changing color.

DESCRIPTION OF THE INVENTION

In the practice of our invention, dimethylaminoethanol is stabilized against color change at its reflux boiling temperature to produce a color-stabilized dimethylaminoethanol composition. This is done by incorporating in the dimethylaminoethanol a stabilizing amount of a mono- (lower alkanol) amine or a di-(lower alkanol) amine or mixtures thereof such as monoethanolamine, diethanolamine, monopropanolamine, dipropanolamine, monobutanolamine, and dibutanolamine, etc. The preferred practice of our invention is to incorporate in the dimethylaminoethanol 0.25 to about 2.0 wt. percent monoethanolamine or diethanolamine based upon the weight of the dimethylaminoethanol and the especially preferred practice to incorporate therein 0.5 to about 1.0 wt. percent of the color-stabilizing material.

When stabilizing dimethylaminoethanol polyurethane catalyst, it has been determined that the most acceptable, practical range within which to operate is to add 0.25 to about 2.0 wt. percent of the stabilizing lower alkanolamine to the dimethylaminoethanol. While the limits of the amount added are not critical, adding more than 2.0 wt. percent may have an adverse effect upon the dimethylaminoethanol when used as a catalyst for the reaction of isocyanato groups with hydroxyl groups in the production of polyurethane foams, especially polyester polyurethane foams.

It is well known in the polyurethane art that the blends of catalysts affect the relative reaction rates of the urethane linking reaction and blowing agent liberation. Dimethylaminoethanol has been found to be an outstanding catalyst to be used in the balancing of the reaction rates in the production of polyurethane foams. We have discovered that by adding more than 2.0 wt. percent of the stabilizing amine to dimethylaminoethanol, this delicate balance is disturbed. It is therefore preferable not to use more than this amount, even though in some instances a greater amount of the stabilizing compound may be tolerated.

It is intended that the scope of our invention encompass those situations wherein the dimethylaminoethanol is stabilized against a color change at its reflux boiling temperature by a stabilizing amount of a mono-(lower alkanol) amine or a di-(lower alkanol) amine wherein the alkanol group has from two to about four carbon atoms and is not necessarily limited to situations wherein the dimethylaminoethanol is used as a polyurethane catalyst. It is to be understood that the scope of this invention encompasses stabilizing the dimethylaminoethanol against color change in all situations wherein it is subjected to its reflux boiling temperature for a sustained period of time. It will be seen from the following example that unstabilized dimethylaminoethanol has a rather rapid change in color when subjected to its reflux boiling temperature as compared to the color-stabilized material.

Where the color-stabilized dimethylaminoethanol composition consists essentially of the dimethylaminoethanol and the lower alkanolamine, it is to be understood that this includes the situation wherein there are nonconsequential amounts of impurities in either material.

The following example is for purposes of illustration of our invention and is not intended to be limiting thereof.

EXAMPLE

To test samples of dimethylaminoethanol which contained less than 0.05% each of monoethanolamine and diethanolamine was incorporated by adding and mixing monoethanolamine and diethanolamine in amounts as indicated in the following table. Each of five test samples was analyzed for color on the APHA (platinum-cobalt) color scale at 435 m$\mu$ in a 50 mm. cell using a Beckman Model B spectrophotometer. Two hundred milliliters of each test sample were refluxed at static reflux conditions at a temperature range of 130° to 137° C. Each test flask was sampled at 40, 60 and 90 minutes after the refluxing started, and the color of each sample was measured as were the initial test charges. The test results in Table 1 illustrate the outstanding qualities of the color stabilizer of our invention.

TABLE 1

| Test | Pt.-Co. color at test time, minutes | | | |
|---|---|---|---|---|
| | 0 | 40 | 60 | 90 |
| 1. DME (dimethylaminoethanol) | 40 | 168 | 250 | 320 |
| 2. DME plus 0.5% monoethanolamine | 40 | 40 | 40 | 55 |
| 3. DME plus 1.0% monoethanolamine | 40 | 40 | | 30 |
| 4. DME plus 0.5% diethanolamine | 40 | 73 | 85 | 104 |
| 5. DME plus 1.0% diethanolamine | 40 | 55 | 74 | 90 |

What is claimed is:

1. Color-stabilized dimethylaminoethanol consisting essentially of dimethylaminoethanol and from 0.25 to about 2.0 wt. percent of monoethanolamine or diethanolamine.

2. The stabilized dimethylaminoethanol of claim 1 wherein the stabilizing amine is monoethanolamine.

References Cited

UNITED STATES PATENTS 3,207,790   9/1965   Glew et al. _____ 260—584

CHARLES B. PARKER, Primary Examiner

R. L. RAYMOND, Assistant Examiner

U.S. Cl. X.R.

260—77.5